United States Patent [19]

Endo et al.

[11] Patent Number: 4,689,351
[45] Date of Patent: Aug. 25, 1987

[54] PROCESS FOR PRODUCING FOAMED PARTICLES OF PROPYLENE COPOLYMER RESIN

[75] Inventors: Hiroshi Endo; Toshio Yagi; Masahiro Tanaka; Takanori Suzuki, all of Mie, Japan

[73] Assignee: Mitsubishi Yuka Badische Co., Ltd., Yokkaichi, Japan

[21] Appl. No.: 899,782

[22] Filed: Aug. 22, 1986

Related U.S. Application Data

[63] Continuation of Ser. No. 785,407, Oct. 8, 1985, abandoned.

[51] Int. Cl.$^4$ ............................................. C08J 9/18
[52] U.S. Cl. ...................................... 521/60; 521/56; 521/58
[58] Field of Search ............................ 521/58, 56, 60

[56] References Cited

U.S. PATENT DOCUMENTS

| | | | |
|---|---|---|---|
| 2,450,436 | 10/1948 | McIntire | 521/79 |
| 2,576,977 | 12/1951 | Stober | 521/79 |
| 4,436,840 | 3/1984 | Akiyama et al. | 521/58 |
| 4,443,393 | 4/1984 | Akiyama et al. | 521/58 |
| 4,448,901 | 5/1984 | Senda et al. | 521/58 |
| 4,464,484 | 8/1984 | Yoshimura et al. | 521/58 |
| 4,524,154 | 6/1985 | Maeda et al. | 521/58 |
| 4,525,485 | 6/1985 | Maeda et al. | 521/58 |

*Primary Examiner*—Morton Foelak
*Attorney, Agent, or Firm*—Oblon, Fisher, Spivak, McClelland & Maier

[57] ABSTRACT

A process for producing propylene random copolymer resin foamed particles is disclosed. The process comprises dispersing propylene-ethylene random copolymer resin particles having an ethylene content of from 1 to 12% by weight in water in a closed vessel, feeding an inorganic gas into the closed vessel to raise the pressure within the closed vessel to at least 5 Kg/cm$^2$G, heating the dispersion to a temperature above the melting point of said copolymer resin particles but not higher than that by 25° C. or more, opening a discharge port provided in the closed vessel below the water surface, and releasing the copolymer resin particles together with water as a dispersing medium into an atmosphere having a lower pressure than in the closed vessel. A foamed product produced by molding the foamed particles has firm bondage among the particles and excellent mechanical strength.

12 Claims, 1 Drawing Figure

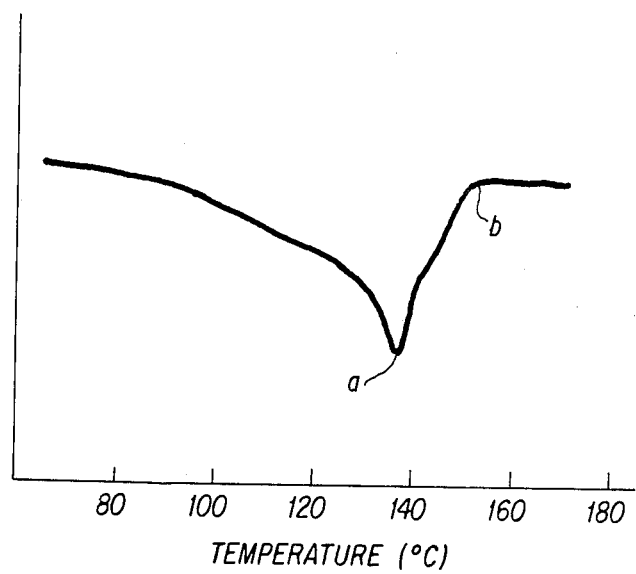

PROCESS FOR PRODUCING FOAMED PARTICLES OF PROPYLENE COPOLYMER RESIN

This application is a continuation of application Ser. No. 785,407, filed Oct. 8, 1985, now abandoned.

FIELD OF THE INVENTION

This invention relates to a process for producing foamed particles of a propylene copolymer resin. A foamed product obtained by filling the foamed particles produced by the process of this invention in the cavity of a mold having steam holes and steam-heating the foamed particles to melt-adhere the particles to each other has firm bondage between the particles and excellent mechanical strength, and is useful as a heat insulating material for hot water pipes or solar heaters, a packaging and cushioning material for refrigerators or television sets, and the like.

BACKGROUND OF THE INVENTION

Polystyrene foams have been used in wide applications because of their excellent performances as a heat insulating material and a packaging and cushioning material. However, they have a low recovery of compression strain and can withstand heat at a temperature of 70° to 80° C. at the highest. These defects may be eliminated by using polypropylene foams It is difficult, however, to produce foamed particles suitable as a starting material for polypropylene foams since blowing agents used for a polypropylene resin have a high speed of dissipation. Any foamed particles that may be obtained have a low expansion ratio with a bulk density of from 0.1 to 0.5 $g/cm^3$ at the highest.

In an attempt to solve this problem, there has been proposed a process for producing high-expansion polypropylene foamed particles having a bulk density of from 0.05 to 0.07 $g/cm^3$, which comprises dispersing polypropylene resin particles containing 10 to 70% by weight of inorganic fillers in water as a dispersing medium in a closed vessel, maintaining the dispersion at a high pressure above the saturated vapor pressure of the dispersion and at a temperature above the softening point but below the melting point of the polypropylene to thereby penetrate the dispersing medium into the polypropylene resin particles, and then jetting the dispersion from the inside of the closed vessel under high pressure into the atmosphere, as disclosed in U.S. Pat. No. 3,770,663 (corresponding to Japanese Patent Publication No. 2183/74).

The above-described process employs water that is used as a dispersing medium and also serves as a blowing agent and is, therefore, advantageous in that foamed particles can be produced at lower cost as compared with the processes using organic blowing agents, such as dichlorofluoromethane, butane, hexane, etc. Nevertheless, the presence of a large quantity of inorganic fillers is unfavorable as inhibiting melt-adhesion among particles during molding of the foamed particles.

On the other hand, a process for producing polyolefin resin foamed particles which comprises dispersing polyolefin resin particles in water in a closed vessel, feeding a volatile organic blowing agent into the closed vessel, heating the dispersion to a temperature above the softening point of the polyolefin resin particles while maintaining the pressure within the closed vessel at the vapor pressure of the blowing agent or a higher pressure for a given period of time, opening a discharge port provided in the closed vessel below the liquid level, and releasing the polyolefin resin particles containing the blowing agent together with water into an atmosphere having a lower pressure than the pressure within the closed vessel has been proposed as described in Japanese Patent Application (OPI) Nos. 12035/82, 25336/82, 90027/82, 195131/82, 1732/83, 23834/83, 25334/83, 33435/85, 55231/83 (EP 75897), 76229/83 76231/83, 76232/83, 76233/83, 76234/83 and 87027/83.

This process can provide foamed particles having a high rate of expansion of from 15 to 50 by using non-crosslinking polypropylene. However, use of a volatile blowing agent leads to an increase in cost for the production of foamed particles.

The present inventors have conducted research in an attempt to obtain polypropylene resin foamed particles having a rate of expansion of from 5 to 20 and uniform size distribution without using a hydrophilic inorganic filler in the aforesaid process disclosed in U.S. Pat. No. 3,770,663 which does not involve use of a volatile blowing agent. As a result, it has been found that expansion of highly crystalline homopolypropylene is difficult and that a propylene-ethylene random copolymer only produces foamed particles having a rate of expansion of 2 to 3 at the most. Further, the thus formed particles have non-uniform size and shape. Non-uniformity of the shape of foamed particles causes non-uniform packing of the particles in molding, resulting in the failure of obtaining molded articles having constant mechanical properties.

SUMMARY OF THE INVENTION

As a result of further investigations for the purpose of economically producing resin foamed particles having a rate of expansion of 5 or more, it has now been found that resin foamed particles having a rate of expansion of 5 or more and a uniform size distribution can be obtained without using either an inorganic filler in resin particles or a volatile blowing agent by (a) using, as resin particles, a propylene-ethylene random copolymer having an ethylene content of from 1 to 12% by weight, (b) applying a pressure to a dispersion within a closed vessel so as to have a pressure of at least 5 $Kg/cm^2G$ by an inorganic gas, and (c) maintaining the dispersion at a temperature exceeding the melting point of the resin particles but not higher than that by 25° C. or more. The present invention has been completed based on this finding.

That is, the present invention relates to a process for producing propylene random copolymer resin foamed particles, which comprises dispersing propylene-ethylene random copolymer resin particles having an ethylene content of from 1 to 12% by weight in water, introducing an inorganic gas into a closed vessel so as to raise the pressure within the closed vessel to at least 5 $Kg/cm^2G$, heating the dispersion to a temperature exceeding the melting point of the copolymer resin particles but not higher than that by 25° C. or more, opening a discharge port provided in the closed vessel below the water surface, and releasing the copolymer resin particles together with water as a dispersing medium into an atmosphere having a lower pressure than that in the closed vessel.

BRIEF DESCRIPTION OF THE ACCOMPANYING DRAWING

FIG. 1 is a differential thermal analysis curve of the resin particles used in the present invention.

DETAILED DESCRIPTION OF THE INVENTION

The propylene-ethylene random copolymer particles which are dispersed in water in the present invention are propylene-based random copolymer particles having an ethylene content of from 1 to 12% by weight, which are obtained by copolymerizing propylene and ethylene and, if desired, other α-olefins, e.g., butene-1, 4-methylpentene, etc. The content of the α-olefin comonomer should not exceed 15% by weight.

Since homopolypropylene is of high crystallinity (e.g., having isotacticity of 95 to 99%), it is difficult to impregnate water as a dispersing medium into particles of homopolypropylene. Therefore, it is required for obtaining foamed particles having a rate of expansion of 5 or more that the dispersion be maintained under high pressure at high temperature for a prolonged retention time. This readily leads to blocking of resin particles each other and non-uniformity in shape of the resulting foamed particles.

In the present invention, for the purpose of lowering crystallinity of resin particles to facilitate impregnation of water into the particles, propylene is copolymerized with ethylene to produce a propylene-ethylene random copolymer (hereinafter sometimes referred to as propylene copolymer or propylene resin) having an ethylene content of from 1 to 12% by weight, and preferably from 2 to 10% by weight. If the ethylene content of the copolymer is greater than 12% by weight, a final foamed product obtained by molding the resulting foamed particles using steam has a low heat resistance.

When a propylene-ethylene block copolymer is employed as a starting resin instead of the random copolymer, a final foamed product obtained from the resulting foamed particles shows only poor cushioning characteristics, i.e., a low repulsion force against compression.

Impregnation of water into the propylene-ethylene random copolymer particles can further be facilitated by blending with resins that are not of high crystallinity, such as polyethylene, an ethylene-vinyl acetate copolymer, Surlyn (a trade name for a series of ionomers produced by E. I. du Pont de Nemours & Co. Inc.), etc., non-crystallizable resins, such as polystyrene, an ABS resin, etc., or rubbers, such as a styrene-butadiene rubber, an ethylene-propylene rubber, etc. These resins may be added to the propylene-ethylene random copolymer in amounts up to 20% by weight based on the total resin components.

The resin to be used may further contain inorganic fillers, e.g., zeolite, silica, talc, etc., woodmeal, pigments, thermal stabilizers, dyes, lubricants such as metal salts of higher aliphatic acids having 12 to 22 carbon atoms, antistatic agents, dispersants such as esters of polyhydric alcohols selected from glycerin, sorbitan or polyglycerin and higher aliphatic acids having 12 to 22 carbon atoms, and the like. The amounts of these additives should not be greater than 5% by weight, and preferably not be greater than 2% by weight, based on the total resin components so as not to impair good melt of foamed particles to each other upon steam-heating.

The polypropylene particles containing 0.4 to 2 wt % of aluminum stearate and/or zinc stearate or containing 0.4 to 2 wt % of aluminum stearate and/or zinc stearate and 0.05 to 5 wt % of the ester of the polyhydric alcohol and higher aliphatic acid are preferred in that the foamed particles have uniform particle distribution and particle size.

The individual propylene random copolymer particles have a weight of from 0.01 to 20 mg.

A dispersing agent which can be used for dispersing the propylene resin particles in water includes sparingly water-soluble inorganic dispersing agents, such as titanium oxide, aluminum oxide, calcium carbonate, basic magnesium carbonate, zinc carbonate, calcium tertiary phosphate, etc. The dispersing agent serves to prevent mutual melt-adhesion of the propylene resin particles dispersed in water when heated to a temperature above the softening point of the propylene resin. The inorganic dispersing agents are frequently employed because of their stability at high temperatures as compared with water-soluble high polymeric protective colloids having poor heat stability, such as polyvinyl alcohol, methylcarboxy cellulose, N-polyvinylpyrrolidone, etc.

If in using calcium tertiary phosphate as a dispersing agent, it is desirably used in combination with a suspending aid, such as anionic surface active agents, e.g., sodium dodecylbenzenesulfonate, sodium alkanesulfonates, sodium alkylsulfates, sodium olefin sulfates, acylmethyltaurines, sodium dialkylsulfosuccinates, etc.; nonionic surface active agents, e.g., polyoxyethylene alkyl ethers, polyoxyethylene fatty acid esters, polyoxyethylene alkylphenol ethers, sorbitan fatty acid esters, polyoxyethylene sorbitan fatty acid esters, etc.; amphoteric surface active agents, e.g., alkylbetains, alkyldiethylenetriaminoacetic acids, etc.

A particularly preferred dispersing agent is a suspension of sparingly water-soluble calcium tertiary phosphate $[Ca_3(PO_4)_2]$ which is prepared by mixing an aqueous solution of calcium hydroxide and an aqueous solution of phosphoric acid to react 0.60 to 0.67 mole of phosphoric acid per mole of calcium hydroxide, and sodium dodecylbenzenesulfonate is used as a suspending aid. This suspension has a pH of from 8.5 to 11.5 and contains the sparingly water-soluble calcium tertiary phosphate having an average particle size of from 0.01 0.8 μm as a main component. The suspension may sometimes contain hydroxyapatite ($[Ca_3(PO_4)_2]_3$·$Ca(OH)_2$).

The above-described suspension can be utilized as a dispersing medium for the propylene resin particles by adjusting the concentration of the sparingly water-soluble salt to 0.01 to 2% by weight. If the concentration of the sparingly water-soluble salt is less than 0.01% by weight, the propylene resin particles are apt to undergo blocking. In concentrations exceeding 2% by weight, melt-adhesion of foamed particles is inhibited. Water as a dispersing medium may contain a water-soluble medium, e.g., methanol, ethanol, glycerin, ethylene glycol, etc.

The surface active agent used as a suspending aid, e.g., sodium dodecylbenzenesulfonate, is used in an amount of from 0.0001 to 0.005% by weight based on water as a dispersing medium. When it is used in amounts less than 0.0001% by weight, blocking of the propylene resin particles tends to occur upon heating under high pressure. On the other hand, amounts more than 0.005% by weight do not bring about any further improvement in anti-blocking property, only resulting in an economic disadvantage.

The amount of water to be used as a dispersing medium is from 200 to 1,000 parts by weight, and preferably from 250 to 500 parts by weight, per 100 parts by weight of propylene resin particles. If the amount of water is less than 200 parts by weight, the propylene resin particles are apt to undergo blocking with each other, and amounts exceeding 1,000 parts by weight result in reduction of productivity of propylene resin foamed particles and are not, therefore, economical.

In carrying out the present invention, propylene resin particles are dispersed in water using a sparingly water-soluble calcium tertiary phosphate having an average particle size of from 0.01 to 0.8 $\mu$m as a dispersing agent and a surface active agent as a suspending aid, and an inorganic gas, e.g., air, nitrogen, argon, etc., is supplied to the aqueous dispersion in a closed vessel to apply pressure. After the pressure within the closed vessel is raised to 5 Kg/cm$^2$G or more, and preferably to 10 to 30 Kg/cm$^2$G, the aqueous dispersion is heated to a temperature above the melting point of the propylene resin but not higher than that by 25° C. or more and then maintained at that temperature for a period of 30 minutes or more, and preferably from 1 to 12 hours to ensure impregnation of water into the resin particles. Thereafter, the propylene resin particles are released together with water as a dispersing medium from a discharge port, e.g., a slit, a nozzle, etc., provided in the lower portion of the closed vessel into a zone kept at a lower pressure than in the closed vessel, generally at atmospheric pressure. As a result, propylene resin foamed particles having a bulk density of from 0.026 to 0.2 g/cm$^3$ can be obtained.

The heating of the dispersion raises the pressure in the closed vessel to 10 to 50 Kg/cm$^2$G whereby water is impregnated into propylene resin particles to produce foamable resin particles.

The inorganic gas introduced in the closed vessel functions to facilitate release of the aqueous dispersion into the atmosphere, prevents the propylene resin particles from remaining within the closed vessel after the discharge of the aqueous dispersion, and is significant for obtaining propylene resin foamed particles having fine and uniform cells.

The pressure within the closed vessel should be raised by supplying the inorganic gas to at least 5 Kg/cm$^2$G in order to produce foamed particles having a rate of expansion of 5 or more. If the pressure is the same as the saturated vapor pressure of water, only the surface portion of the individual resin particles is expanded with the core portion thereof remaining unexpanded.

It is assumed that impregnation of water into the resin particles can selectively proceed in noncrystalline portion rather than in crystalline portion of the particles.

Determination of the heating temperature can be carried out by differential thermal analysis of the resin particles as shown in FIG. 1. That is, the heating temperature can be set between a temperature about 2° to 3° C. higher than a thermal peak showing a crystal fusion point (so-called melting point) of the differential thermal analysis curve (point a) and a temperature about 10° C. higher than a temperature at which the descending curve reaches the bottom of the curve (point b). The temperature at point b is preferred. For example, the heating temperature can be selected from 145° to 160° C. in the case of a propylene copolymer having a melting point of 140° C., and from 137° to 160° C. in the case of a propylene-ethylene-butene-1 copolymer having a melting point of 135° C.

If the heating temperature is not higher than the melting point of the resin particles, the resulting foamed particles contain 2 to 8% by weight of foamed particles lacking uniformity in shape and, in addition, the retention time should be uneconomically extended for ensuring a high rate of expansion. On the other hand, too a high heating temperature causes blocking of resin particles in the dispersion. Accordingly, the upper limit of the heating temperature is set at a temperature 25° C. higher than the melting point of the resin, and the retention time should be controlled so that blocking of the resin particles may not occur.

The retention time for maintaining the dispersion at a temperature exceeding the melting point of the resin depends on the pressure applied, heating temperature and desired rate of expansion, but usually ranges from 30 minutes to 12 hours, and preferably from 1 to 3 hours. When the dispersion after having been maintained for the above retention time is released into the atmosphere, the pressure of water impregnated into the resin particles is drastically released whereby the water volume is expanded several hundreds times to expand the resin particles. The higher the rate of release of the dispersion (e.g., 200 to 500 m/sec.), the better for increasing the rate of expansion. A lower rate of release, e.g., 30 to 200 m/sec., may also be employed. Since release of the dispersion at a high rate makes a high pop, a noise control measure should be taken.

The release of the dispersion from a high pressure zone into a lower pressure zone is carried out through a single or a plurality of openings of a slit type or the like.

The foamed particles thus produced are dried in a chamber set at 30° to 65° C. to remove water attached on the particle surfaces and then molded into cushioning materials, containers, and the like.

Various known methods of molding can be used. Examples of such methods are:

(1) a method which comprises filling the propylene resin foamed particles in a mold, compressing the foamed particles to reduce their volume by 15 to 50%, introducing steam under pressure of 1 to 5 Kg/cm$^2$G to melt-adhere the foamed particles to each other, and then cooling the mold to obtain a final product;

(2) a method which comprises previously impregnating the foamed particles with a volatile blowing agent to impart secondary foamability to them, filling the foamed particles in a mold and molding them with steam;

(3) a method which comprises putting the foamed particles in a closed chamber, introducing an inorganic gas, e.g., air or nitrogen, under pressure into the chamber to increase the pressure of the foamed particles in the cells and thus impart secondary foamability, filling the foamed particles in a mold, and molding them with steam; and (4) a combination of two or more of the methods (1), (2) and (3).

The propylene resin foamed products as obtained above show excellent melt-adhesion among the particles and high mechanical strength.

The present invention will now be illustrated in greater detail with reference to the following examples and comparative examples, but it should be understood that these examples are not limiting the present invention. In these examples, all the parts and percents are by weight unless otherwise indicated.

EXAMPLE 1

An aqueous solution of 0.859 part of calcium hydroxide in 1,200 parts of water and 4.46 parts of a 17% aqueous solution of phosphoric acid were mixed to precipitate 0.1% of a salt having a particle size of 0.05 to 0.3 μm (pH 9.2). Sodium dodecylbenzenesulfonate was added thereto to prepare a dispersion (pH 9.2; salt concentration: 0.1%; dodecylbenzenesulfonic acid concentration: 0.003%).

In an autoclave having a discharge nozzle at the bottom thereof was placed 1,200 parts of the above prepared dispersion (at 20° C.), and 400 parts of an ethylene(4%)-propylene(96%) random copolymer particles each weighing about 1 mg, containing 0.03% of calcium stearate and 0.5% of a stabilizer, and having a melting point of 137° C. was added thereto. Nitrogen gas was then fed into the autoclave until the pressure inside the autoclave reached 10 Kg/cm$^2$G. Thereafter, the dispersion was heated to 150° C. over a period of about 100 minutes and maintained at that temperature for 20 minutes, whereupon the pressure inside the autoclave rose to about 21 Kg/cm$^2$G. The heating was further continued at 150° C. and, after maintaining the dispersion at that temperature for an additional 2 hours, the valve of the discharge nozzle at the bottom of the autoclave was opened, and the dispersion was released therethrough into the atmosphere for 2 seconds to perform foaming. According to differential thermal analysis, the foamable propylene copolymer particles before being released had a water content of about 4%. The pressure within the autoclave at the time when the final portion of the dispersion was released from the autoclave, i.e., at the time when the gaseous phase began to be discharged, was about 9 Kg/cm$^2$G. During the release of the dispersion, the temperature of the autoclave was kept at 150° C.

The resulting propylene copolymer foamed particles had a bulk density of about 0.13 g/cm$^3$. The size and shape of the foamed particles were substantially uniform, and no blocking of the particles was observed.

After the foamed particles were allowed to stand at 40° C. for 2 days to remove moisture, they were placed in a closed chamber, and air was introduced therein under a pressure of 3 Kg/cm$^2$G for 48 hours to thereby impart secondary foamability to the particles (ageing under pressure).

The foamed particles having secondary foamability were filled in a mold cavity having steam holes. Steam under pressure of 4.5 Kg/cm$^2$G was then introduced into the mold cavity to effect secondary foaming and melt-adhesion of the foamed particles to each other. The mold cavity was then cooled to give a propylene copolymer foamed product having a bulk density of about 0.11 g/cm$^3$, a length of 200 mm, a width of 300 mm and a height of 50 mm.

The resulting foamed product was broken into two halves with hands and evaluated for the degree of melt-adhesion. The term "degree of melt-adhesion" means a percentage of the number of foamed particles which are broken along the cross-section to the total number of the foamed particles on the cross-section. In other words, the degree of melt-adhesion is estimated as 0% when all the foamed particles on the cross-section were separated along their boundaries and as 100% when all of the foamed particles on the cross-section were broken. The foamed product as above obtained had a degree of melt-adhesion of 74%.

EXAMPLES 2 to 8 and COMPARATIVE EXAMPLES 1 to 3

Propylene resin foamed particles were produced in the same manner as described in Example 1 except for changing the production conditions of pressure applied by nitrogen gas and temperature, pressure and time for maintaining the dispersion after the pressure application as shown in Table 1 below.

A foamed product was obtained from each of the resulting foamed particles in the same manner as in Example 1. The degree of melt-adhesion and other properties of the foamed product are shown in Table 1 together with the properties of the foamed particles.

EXAMPLES 9 to 11 and COMPARATIVE EXAMPLE 4

Propylene resin foamed particles were produced in the same manner as described in Example 1 but changing the ethylene content of the propylene resin particles and the production conditions as shown in Table 1 below. A foamed product was obtained from each of the resulting foamed particles in the same manner as in Example 1, and the results obtained are shown in Table 1 below.

REFERENCE EXAMPLE

Foamed particles were produced in the same manner as described in Example 1 except for using propylene-ethylene random copolymer particles containing 10% of talc. The resulting foamed particles had a rate of expansion of 15 but poor uniformity in size. No blocking of the particles was observed.

When the foamed particles were molded in the same manner as in Example 1, the resulting foamed product had a degree of melt-adhesion of 30%.

TABLE 1

| | Production Conditions | | | | | Foamed Particles | | | Foamed Product | | |
|---|---|---|---|---|---|---|---|---|---|---|---|
| Example No. | Ethylene Content of Resin Particles (wt %) | Pressure Applied by N$_2$ (Kg/cm$^2$G) | Heating Temperature (°C.) | Retention Time (hr) | Pressure Maintained (Kg/cm$^2$G) | Bulk Density (g/cm$^3$) | Blocking | Shape | Degree of Melt-Adhesion (%) | Heat Resistance (°C.) | Appearance |
| Ex. 1 | 4 | 10 | 150 | 2 | 21 | 0.130 | not observed | good | 74 | 120 | O |
| Ex. 2 | 4 | 5 | 150 | 2 | 13 | 0.130 | " | " | 70 | " | O |
| Ex. 3 | 4 | 15 | 150 | 2 | 28 | 0.087 | " | " | 90 | " | O |
| Ex. 4 | 4 | 20 | 150 | 2 | 33 | 0.061 | " | " | 90 | " | O |
| Ex. 5 | 4 | 20 | 155 | 0.5 | 34 | 0.072 | " | " | 90 | " | O |
| Ex. 6 | 4 | 20 | 145 | 4 | 32 | 0.054 | " | " | 90 | " | O |
| Ex. 7 | 4 | 20 | 145 | 10 | 32 | 0.045 | " | " | 90 | " | O |
| Ex. 8 | 4 | 30 | 160 | 2 | 45 | 0.030 | " | " | 95 | " | O |
| Comp. Ex. 1 | 4 | 0 | 150 | 2 | 5 | 0.450 | " | — | — | — | — |
| Comp. | 4 | 20 | 165 | 2 | 35 | 0.095 | observed | poor | 85 | 120 | X |

TABLE 1-continued

| | Production Conditions | | | | Foamed Product | | | | | |
|---|---|---|---|---|---|---|---|---|---|---|
| | Ethylene Content of Resin Particles (wt %) | Pressure Applied by $N_2$ (Kg/cm$^2$G) | Heating Temperature (°C.) | Retention Time (hr) | Pressure Maintained (Kg/cm$^2$G) | Foamed Particles | | | Degree of Melt-Adhesion (%) | Heat Resistance (°C.) | Appearance |
| Example No. | | | | | | Bulk Density (g/cm$^3$) | Blocking | Shape | | | |
| Ex. 2 Comp. Ex. 3 | 4 | 20 | 135 | 2 | 31 | 0.500 | not observed | — | — | — | — |
| Ex. 9 | 2 | 20 | 160 | 2 | 34 | 0.100 | " | good | 85 | 120 | O |
| Ex. 10 | 6 | 20 | 140 | 2 | 31 | 0.065 | " | " | 90 | " | O |
| Ex. 11 | 8 | 20 | 137 | 2 | 31 | 0.070 | " | " | 90 | 110 | O |
| Comp. Ex. 4 | 14 | 20 | 133 | 2 | 30 | 0.085 | observed | poor | 80 | 100 | X |

EXAMPLE 12

An aqueous solution of 0.0716 part of calcium hydroxide in 100 parts of water and 0.372 part of a 17% aqueous solution of phosphoric acid were mixed to precipitate 0.1% of a salt having a particle size of 0.05 to 0.3 μm (pH 9.2). Sodium dodecylbenzenesulfonate was added thereto to prepare a dispersion (pH 9.2; salt concentration: 0.1%; dodecylbenzenesulfonic acid concentration: 0.003%).

In an autoclave having a discharge nozzle at the bottom thereof was placed 100 parts of the above prepared dispersion, and 33 parts of an ethylene (4%)-propylene(96%) random copolymer particles each weighing about 1 mg, containing 0.05% of aluminum stearate and 0.5% of a stabilizer, and having a melting point of 137° C. was added thereto. Nitrogen gas was then fed into the autoclave until the pressure inside the autoclave reached 10 Kg/cm$^2$G. Thereafter, the dispersion was heated to 135° C. over a period of about 60 minutes and maintained at that temperature for 20 minutes, whereupon the pressure inside the autoclave rose to about 30 Kg/cm$^2$G. The heating was further continued at 150° C. and, after maintaining the dispersion at that temperature for an additional 2 hours, the valve of the discharge nozzle at the bottom of the autoclave was opened, and the dispersion was released therethrough ingo the atmosphere for 2 seconds to perform foaming. According to differential thermal analysis, the foamable polypropylene particles before being released had a water content of about 4%. The pressure within the autoclave at the time when the final portion of the dispersion was released from the autoclave, i.e., at the time when the gaseous phase began to be discharged, was about 9 Kg/cm$^2$G. During the release of the dispersion, the temperature of the autoclave as kept at 150° C.

The resulting polypropylene foamed particles had a bulk density of about 0.13 g/cm$^3$. The size and shape of the foamed particles were substantially uniform, and no blocking of the particles was observed.

After the foamed particles were allowed to stand at 40° C. for 2 days to remove moisture, they were placed in a closed chamber, and air was introduced therein under a pressure of 3 Kg/cm$^2$G for 48 hours to thereby impart secondary foamability to the particles (ageing under pressure).

The foamed particles having secondary foamability were filled in a mold cavity having steam holes. Steam under pressure of 4.5 Kg/cm$^2$G was then introduced into the mold cavity to effect secondary foaming and melt-adhesion of the foamed particles to each other. The mold cavity was then cooled to give a polypropylene foamed product having a bulk density of about 0.11 g/cm$^3$, a length of 200 mm, a width of 300 mm and a height of 50 mm.

The resulting foamed product was broken into two halves with hands and evaluated for the degree of melt-adhesion. The term "degree of melt-adhesion" means a percentage of the number of foamed particles which are broken along the cross-section to the total number of the foamed particles on the cross-section. In other words, the degree of melt-adhesion is estimated as 0% when all the foamed particles on the cross-section were separated along their boundaries and as 100% when all of the foamed particles on the cross-section were broken. The foamed product as above obtained had a degree of melt-adhesion of 70%.

EXAMPLE 13

Foamed particles were produced in the same manner as described in Example 12 except for using an ethylene (4%)-propylene(96%) random copolymer particles containing 0.5% of zinc stearate, 0.05% of calcium stearate and 0.5% of a stabilizer.

The resulting polypropylene foamed particles had a bulk density of about 0.11 g/cm$^3$. The size and shape of the foamed particles were substantially uniform, and no blocking of the particles was observed. The foamable particles before being released had a water content of about 3.8%.

Using the foamed particles, a foamed product having a bulk density of about 0 10 g/cm$^3$ was obtained in the same manner as in Example 12.

The foamed product thus obtained had a degree of melt-adhesion of about 65%.

EXAMPLE 14

Foamed particles were produced in the same manner as described in Example 12 except for using an ethylene(4%)-propylene(96%) random copolymer particles containing 1.0% of aluminum stearate, 1.0% of glycerin monostearate and 0.5% of a stabilizer.

The resulting polypropylene foamed particles had a bulk density of about 0.061 g/cm$^3$ The size and shape of the foamed particles were substantially uniform, and no blocking of the particles was observed. The foamable particles before being released had a water content of about 3.8%.

Using the foamed particles, a foamed product having a bulk density of about 0.06 g/cm$^3$ was obtained in the same manner as in Example 12.

The foamed product thus obtained had a degree of melt-adhesion of about 60%.

EXAMPLE 15

Polypropylene foamed particles having substantially uniform size and shape were obtained in the same manner as in Example 12 except that an ethylene(9%)-propylene random copolymer was used and the temperature at the release of the dispersion was 155° C.

EXAMPLE 16

Foamed polypropylene particles having substantially uniform size and shape were produced in the same manner as in Example 12 except for using an ethylene(4%)-propylene random copolymer containing 1.0% of aluminum stearate and 1.0% of glycerin monooleate.

The foamed particles had a bulk density of about 0.056 g/cm$^3$.

EXAMPLE 17

Foamed polypropylene particles having substantially uniform size and shape were produced in the same manner as in Example 12 except for using an ethylene(4%)-propylene random copolymer containing 1.0% of aluminum stearate, of sorbitan monooleate and 0.2% of a stabilizer.

The foamed particles had a bulk density of about 0.052 g/cm$^3$.

EXAMPLE 18

Foamed polypropylene particles having substantially uniform size and shape were produced in the same manner as in Example 17 except that polyglycerin monooleate was used in place of sorbitan monooleate.

The foamed particles had a bulk density of about 0.050 g/cm$^3$.

EXAMPLE 19

An aqueous solution of 0.0716 part of calcium hydroxide in 100 parts of water and 0.372 part of a 17% aqueous solution of phosphoric acid were mixed to precipitate 0.1% of a salt having a particle size of 0.05 to 0.3 μm (pH 9.2). Sodium dodecylbenzenesulfonate was added thereto to prepare a dispersion (pH 9.2; salt concentration: 0.1%; dodecylbenzenesulfonic acid concentration: 0.003%).

In an autoclave having a discharge nozzle at the bottom thereof was placed 100 parts of the above prepared dispersion, and 33 parts of an ethylene(4%)-propylene(96%) random copolymer particles each weighing about 1 mg, containing 0.05% of aluminum stearate and 0.2% of a stabilizer, and having a melting point of 137° C. was added thereto. Nitrogen gas was then fed into the autoclave until the pressure inside the autoclave reached 10 Kg/cm$^2$G After adding 18 parts of butane gas to the autoclave while stirring, the dispersion was heated to 130° C. over a period of about 60 minutes and maintained at that temperature for 20 minutes, whereupon the pressure inside the autoclave rose to about 30 Kg/cm$^2$G. The valve of the discharge nozzle at the bottom of the autoclave was opened, and the dispersion was released therethrough into the atmosphere for 2 seconds to perform foaming. According to differential thermal analysis, the foamable propylene copolymer particles before being released had a water content of about 0.18%. The pressure within the autoclave at the time when the final portion of the dispersion was released from the autoclave, i.e., at the time when the gaseous phase began to be discharged, was about 9 Kg/cm$^2$G. During the release of the dispersion, the temperature of the autoclave was kept at 130° C.

The resulting polypropylene foamed particles had a bulk density of about 0.027 g/cm$^3$ Blocking of the particles was not observed.

After the foamed particles were allowed to stand at 40° C. for 2 days to remove moisture, they were placed in a closed chamber, and air was introduced therein under a pressure of 3 Kg/cm$^2$G for 48 hours to thereby impart secondary foamability to the particles (ageing under pressure).

The foamed particles having secondary foamability were filled in a mold cavity having steam holes. Steam under pressure of 4.5 Kg/cm$^2$G was then introduced into the mold cavity to effect secondary foaming and melt-adhesion of the foamed particles to each other. The mold cavity was then cooled to give a polypropylene foamed product having a bulk density of about 0.025 g/cm3, a length of 200 mm, a width of 300 mm and a height of 50 mm.

The resulting foamed product was broken into two halves with hands and evaluated for the degree of melt-adhesion.

The foamed product as above obtained had a degree of melt-adhesion of 70%.

EXAMPLE 20

In an autoclave having a discharge nozzle at the bottom thereof was placed 100 parts of water containing 0.3% of aluminum oxide fine powders, and 33 parts of an ethylene(4%)-Propylene(96%) random copolymer particles each weighing about 1 mg, containing 1.0% of aluminum stearate, 1.0% of glycerin monostearate and 0.2% of a stabilizer, and having a melting point of 137° C. was added thereto. After adding 19 parts of dichlorodifluorobutane to the autoclave, the dispersion was heated to 122° C. over a period of about 60 minutes and maintained at that temperature for 20 minutes, whereupon the pressure inside the autoclave rose to about 33 Kg/cm2G The heating was further continued at 130° C. and, after maintaining the dispersion at that temperature for an additional 2 hours, the valve of the discharge nozzle at the bottom of the autoclave was opened while applying a back pressure by supplying nitrogen gas into the autoclave, and the dispersion was released therethrough into the atmosphere for 2 seconds to perform foaming. The pressure within the autoclave at the time when the final portion of the dispersion was released from the autoclave, i.e., at the time when the gaseous phase began to be discharged, was about 21 Kg/cm$^2$G After the foamed particles were allowed to stand at 40° C. for 2 days to remove moisture, they were placed in a closed chamber, and air was introduced therein under a pressure of 3 Kg/cm$^2$G for 48 hours to thereby impart secondary foamability to the particles (ageing under pressure).

The foamed particles having secondary foamability were filled in a mold cavity having steam holes. Steam under pressure of 4.5 Kg/cm$^2$G was then introduced into the mold cavity to effect secondary foaming and melt-adhesion of the foamed particles to each other. The mold cavity was then cooled to give a polypropylene foamed product having a bulk density of about 0.067 g/cm$^3$, a length of 200 mm, a width of 300 mm and a height of 50 mm.

The resulting foamed product was broken into two halves with hands and evaluated for the degree of melt-adhesion.

The foamed product thus obtained had a degree of melt-adhesion of 50%.

While the invention has been described in detail and with reference to specific embodiments thereof, it will be apparent to one skilled in the art that various changes and modifications can be made therein without departing from the spirit and scope thereof.

What is claimed is:

1. A process for producing foamed particles of a random propylene copolymer resin, which consist of:
   (a) dispersing random propylene-ethylene copolymer resin particles having an ethylene content of from 1 to 12% by weight in water in a closed vessel;
   (b) feeding nitrogen into the closed vessel to raise the pressure within the closed vessel to a level of at least 5 kg/cm$^2$G;
   (c) heating the dispersion to a temperature above the melting point of said copolymer resin particles, but at a temperature not greater than by 25° C. or more;
   (d) opening a discharge port provided in the closed vessel below the water surface; and
   (e) releasing the copolymer resin particles, together with water as the dispersing medium, into an atmosphere having a lower pressure than the pressure in the closed vessel.

2. The process of claim 1, wherein the dispersion is maintained at a temperature above the melting point of the copolymer resin particles as set forth in step (c) of claim 1, for a period of 30 minutes or more.

3. The process of claim 1, wherein the pressure within the closed vessel, immediately before the release of said dispersion, ranges from 10 to 50 kg/cm$^2$G.

4. The process of claim 1, wherein the foamed particles of said random propylene copolymer resin have a bulk density ranging from 0.026 to 0.2 g/cm$^3$.

5. The process as claimed in claim 1, wherein the particles of the random propylene-ethylene copolymer resin each weight from 0.01-20 mg.

6. The process of claim 1, wherein the dispersing of the particles of said random propylene-ethylene copolymer resin in water is conducted in the presence of a mixture comprising calcium tertiary phosphate and sodium dodecylbenzenesulfonate.

7. The process of claim 1, wherein the particles of said random ehtylene-propylene copolymer resin contain 0.4-2% by weight of a metal salt of a higher aliphatic acid having 12-22 carbon atoms.

8. The process of claim 7, wherein the metal salt of a higher aliphatic acid is aluminum stearate or zinc stearate.

9. The process of claim 1, wherein the particles of said ethylene-propylene copolymer resin contain 0.4 to 2% by weight of a metal salt of a higher aliphatic acid having 12 to 22 carbon atoms and 0.05 to 5% by weight of an acid compound of a polyhydric alcohol selected from the group consisting of glycerin, sorbitan and polyglycerin, and a higher aliphatic acid having 12 to 22 carbon atoms.

10. The process of claim 9, wherein the metal salt of a higher aliphatic acid is aluminum stearate or zinc stearate.

11. The process of claim 9, wherein the ester compound is selected from the group consisting of glycerin monostearate, sorbitan monooleate, polyglycerin monooleate and glycerin monooleate.

12. The process of claim 1, wherein the amount of water in said dispersion ranges from 200 to 1,000 parts by weight per 100 parts by weight of said propylene copolymer resin particles.

* * * * *